A. H. MORRISON.
FRICTION CLUTCH.
APPLICATION FILED JAN. 17, 1918.
1,403,052.
Patented Jan. 10, 1922.
2 SHEETS—SHEET 1.
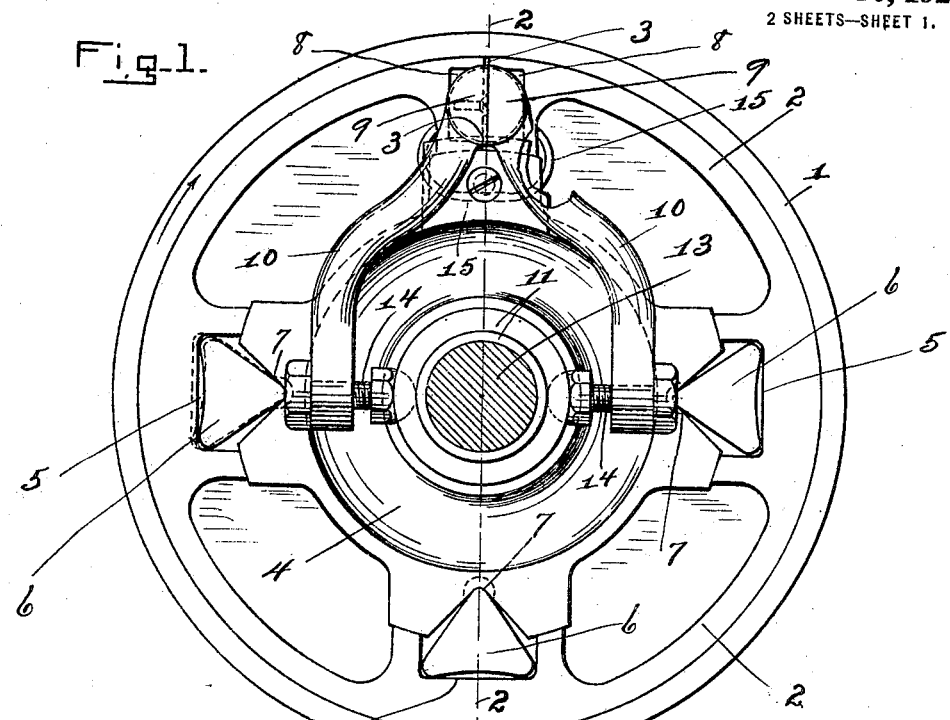
Fig. 1.
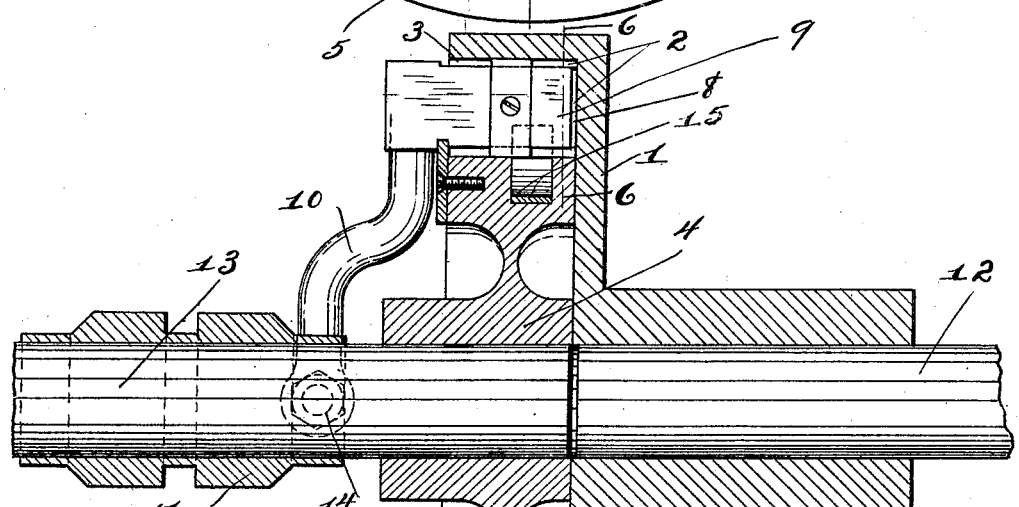
Fig. 2.
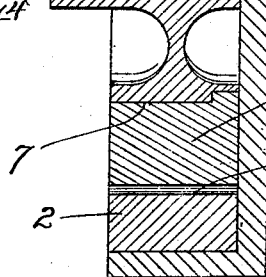
Inventor
Augustus H. Morrison,
By Frank C. Curtis,
Attorney A. H. MORRISON.
FRICTION CLUTCH.
APPLICATION FILED JAN. 17, 1918.
1,403,052.
Patented Jan. 10, 1922.
2 SHEETS—SHEET 2.
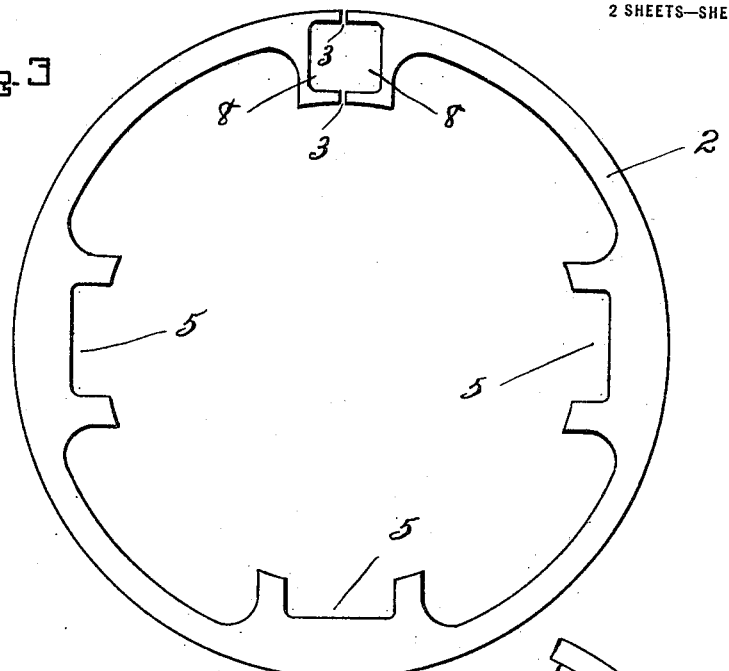
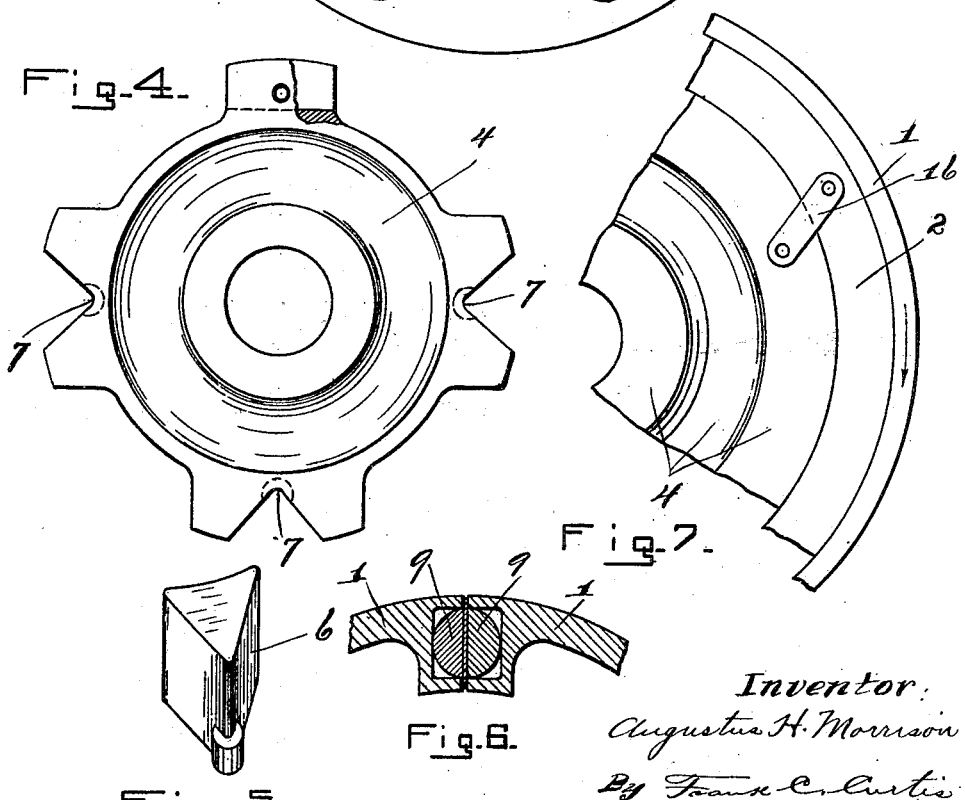
Inventor:
Augustus H. Morrison
By Frank C. Curtis
Attorney

UNITED STATES PATENT OFFICE.

AUGUSTUS H. MORRISON, OF AMSTERDAM, NEW YORK.

FRICTION CLUTCH.

1,403,052.

Specification of Letters Patent.    Patented Jan. 10, 1922.

Application filed January 17, 1918.    Serial No. 212,186.

*To all whom it may concern:*

Be it known that I, AUGUSTUS H. MORRISON, a citizen of the United States, residing at Amsterdam, county of Montgomery, and State of New York, have invented certain new and useful Improvements in Friction Clutches, of which the following is a specification.

Reference may be had to the accompanying drawings, and the reference characters marked thereon, which form a part of this specification. Similar characters refer to similar parts in the several figures therein.

This invention relates to friction-clutches for transmitting power from one to another of two shafts alined end to end.

The principal objects of the invention are to secure a more effective frictional engagement between the driving and driven members of the clutch; and to facilitate the operation of the clutch.

Other objects will appear in connection with the following description.

Fig. 1 of the drawings is a view in end elevation of a friction-clutch embodying my invention, showing in section the shaft on which the inner clutch member is mounted.

Fig 2 is a central longitudinal section of the same taken on the broken line 2—2 in Fig. 1.

Fig. 3 is a plan view of the expansible open-ring detached.

Fig. 4 is a similar view of the hub detached.
Fig. 5 is a view in perspective of one of the dogs detached.

Fig. 6 is a view in cross-section of the ends of the open ring and the ring-expanding members taken on a plane perpendicular to said members, on the broken line 6—6 in Fig. 2.

Fig 7 is a view similar to Fig. 1, of a broken away part of a friction-clutch embodying my invention in modified form.

Referring to the drawings wherein the invention is shown in preferred form, 1 is a cylinder, adapted to be fixed upon a shaft, 12, which is one of two shafts alined end to end. 2 is an open-ring, surrounded by said cylinder, said ring being open or divided at 3, whereby it is made expansible and contractible.

Within the open-ring, 2, is a hub, 4, adapted to be fixed upon the other shaft, 13, alined with the shaft, 12.

The open-ring, 2, is provided on its inner side with a plurality of recesses, 5, each adapted to freely receive the base of a triangular dog, 6, and the hub, 4, is provided with a like number of correspondingly located seats, 7, severally adapted to rockably support the apex of one of said dogs. These dogs, 6, form driving-connections between the hub and the open-ring, whereby power is transmitted from one to the other.

The dogs also serve as a means for expanding the ring against the interior of the cylinder, 1, if a relative rotative movement occurs between the hub and the open-ring, such a relative movement causing the dogs to rock upon their respective seats, which rocking movement forces one corner of the base of each dog outwardly against the bottom of the respective recess, 5.

The ends of the open-ring are provided with oppositely located recesses, 8, of half-square form adapted to receive off-set projections, 9, respectively on the outer ends of a pair of levers, 10, the inner ends of which levers project into the path of a wedge-shaped or cone-shaped sleeve, 11, mounted to slide longitudinally upon the shaft, 13.

The outer off-set end-portions, 9—9, of the levers, 10, mutually fulcrum upon each other, whereby when the sleeve, 11, is driven in between the inner ends of said levers to wedge or spread them apart, the outer surfaces of the projections, 9—9, are forced against the inner walls of the respective recesses, 8, to force apart the ends of the open-ring, 2, to expand the ring into contact with the interior of the cylinder 1.

The off-set projections, 9, on the levers, 10, are preferably semicircular in cross-section with the cylindrical surfaces thus formed presented to the inner walls of the respective recesses, 8.

The engagement of the sleeve, 11, with the inner ends of the levers, 10, is through the medium of a pair of screw-bolts, 14, inserted in the respective levers with the heads of the bolts in the path of said sleeve.

These bolts can be accurately adjusted to cause the sleeve to act similarly upon both levers, and to cause the open-ring, 2, to be uniformly and properly expanded.

The ends of the open-ring, 2, are yieldingly connected together by a spring, 15, which yieldingly resists the action of the levers, 10, to expand the ring, which spring tends to contract the ring as soon as the ring is released from the control of the levers, 10.

The operation of the device is as follows: When it is desired to transmit power from one to the other of the shafts, 12 and 13, the sleeve, 11, is forced between the inner ends of the levers, 10, forcing them apart and forcing the cylindrical surfaces of their off-set ends, 9, against the inner walls of the recesses, 8, thereby spreading the ends, 2, of the open ring apart to expand the ring into frictional engagement with the interior of the cylinder, 1.

As soon as the open-ring, 2, has been thus expanded into frictional engagement with the cylinder, 1, a tendency to relative rotatory movement between the ring, 2, and the hub, 4, is developed which causes the dogs, 6, to rock upon their respective seats, thereby forcing the corner of the base of each dog outwardly to expand the ring, 2, with greater force against the interior of the cylinder, 1, to cause a more effective frictional engagement between said cylinder and said ring.

The clutch is released by withdrawing the sleeve, 11, whereby the levers, 10, are released and the open-ring, under the influence of the spring, 15, contracts to normal size.

In place of the dogs, 6, I may employ any form of driving connection between the hub and the open-ring which is automatically actuated to expand the ring by a relative rotatory movement between the hub and the ring. Thus dogs of various forms may be employed, while in Fig. 7, I have shown an oblique link or strap driving-connection, 16, between the ring, 2, and the hub, 4, said link being pivotally connected with said ring and hub respectively.

For certain purposes of the invention, I may employ in place of the levers, 10, with their off-sets, 9, any known means for expanding the open-ring, 2, initially into frictional engagement with the cylinder, 1.

What I claim as new and desire to secure by Letters Patent is—

1. In a device of the class described and in combination, a cylindrical member; an open-ring surrounded by said cylindrical member and provided on its inner periphery with a recess; a hub; a driving-connection between said hub and said open-ring comprising a triangular dog having its apex rockably mounted upon said hub and its base loosely confined within said recess in said ring; a spring tending to contract said open-ring; and means independent of said dog for expanding said open-ring against the force of said spring.

2. In a device of the class described and in combination, a cylindrical member; an open-ring surrounded by said cylindrical member, and provided on its inner periphery with a recess; a hub; a driving-connection between said hub and said open-ring comprising a triangular dog having its apex rockably mounted upon said hub, and its base loosely confined within said recess in said ring; and means independent of said dog for spreading apart the ends of said ring to expand the same into engagement with said cylindrical member.

3. In a device of the class described and in combination, a cylindrical member; an open-ring surrounded by said cylindrical member, and provided in its ends with oppositely disposed recesses having substantially parallel straight sides; a hub; driving-connections between said hub and said open-ring; a pair of levers terminating at their outer ends in offsets seated in mutual fulcruming engagement in the respective recesses in the ends of said open-ring and having convexed outer surfaces engageable with the respective straight side walls of said recesses; and means for operating said levers.

In testimony whereof, I have hereunto set my hand this 27th day of December, 1917.

AUGUSTUS H. MORRISON.